United States Patent
Grinnip, III

(10) Patent No.: US 9,210,497 B2
(45) Date of Patent: Dec. 8, 2015

(54) ELECTROSTATIC EARPHONE

(75) Inventor: Roger Stephen Grinnip, III, Lake Zurich, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 332 days.

(21) Appl. No.: 13/605,656

(22) Filed: Sep. 6, 2012

(65) Prior Publication Data

US 2014/0064510 A1 Mar. 6, 2014

(51) Int. Cl.
| | |
|---|---|
| H04R 1/10 | (2006.01) |
| H04R 25/00 | (2006.01) |
| C08B 37/08 | (2006.01) |
| C08H 1/00 | (2006.01) |
| C08L 5/08 | (2006.01) |
| C08L 89/00 | (2006.01) |

(52) U.S. Cl.
CPC .......... *H04R 1/1066* (2013.01); *C08B 37/0072* (2013.01); *C08H 1/00* (2013.01); *C08L 5/08* (2013.01); *C08L 89/00* (2013.01); *H04R 1/1075* (2013.01)

(58) Field of Classification Search
None
See application file for complete search history.

(56) References Cited

U.S. PATENT DOCUMENTS

| | | | |
|---|---|---|---|
| 4,383,139 A | 5/1983 | Kanchev | |
| 4,443,666 A | 4/1984 | Cote | |
| 6,842,964 B1 | 1/2005 | Tucker et al. | |
| 2006/0234780 A1* | 10/2006 | Ramsden et al. | 455/569.1 |
| 2006/0239447 A1* | 10/2006 | Sabick | 379/430 |
| 2010/0215197 A1 | 8/2010 | Lee et al. | |
| 2011/0268297 A1 | 11/2011 | Lee | |
| 2012/0008814 A1 | 1/2012 | Alwicker | |
| 2012/0082336 A1 | 4/2012 | Wubker | |
| 2013/0315431 A1* | 11/2013 | Grinker et al. | 381/380 |
| 2015/0092968 A1* | 4/2015 | Grinker et al. | 381/322 |

FOREIGN PATENT DOCUMENTS

DE 3107282 A1 9/1982

OTHER PUBLICATIONS

International Search Report for PCT Patent Application No. PCT/US2013/052609, dated Sep. 13, 2013, pp. 1-4.
Written Opinion for PCT Patent Application No. PCT/US2013/052609, dated Sep. 13, 2013, pp. 1-7.

(Continued)

*Primary Examiner* — Regina N Holder
(74) *Attorney, Agent, or Firm* — William J. Lenz, Esq.; Neal, Gerber & Eisenberg LLP

(57) ABSTRACT

An electrostatic earphone with a closed-back housing, a sleeve for acoustically sealing to an ear canal, and an electrostatic transducer is provided. The closed-back housing may include a nozzle for acoustic transmission of sound to the ear canal, and the sleeve may be removably attached to the nozzle. The electrostatic transducer may include a diaphragm with a conductive layer, stator plates, and diaphragm rings in electrical contact with the conductive layer of the diaphragm. The stator plates may include an outer annular conductive portion and a central conductive portion. The outer annular portion may be in electrical contact with a bias voltage and the diaphragm rings. The central portion may have a dielectric layer and be in electrical contact with an audio signal. The stator plates and the diaphragm may be spaced apart by the diaphragm rings. An amplifier may provide the bias voltage and audio signal to the earphone.

20 Claims, 4 Drawing Sheets

(56) References Cited

OTHER PUBLICATIONS

Greenhill, L., Quad ESL-63 US Monitor Electrostatic Loudspeaker, Stereophile, Feb. 1989, pp. 104-109.
Hietanen, J. et al., An Integrated Printed Circuit Board (PCB) Microphone, The Journal of the Acoustical Society of America, 107(5) Part 1, May 2000, pp. L25-L30.
Lin, S. et al., Electret Receiver for In-ear Earphone, Audio Engineering Society 123rd Convention, New York, NY, Convention Paper 7284, Oct. 5-8, 2007.
STAX SR-001MK2 In-The-Earspeaker System, 1999.
Watkinson, J., The Art of Sound Reproduction, Focal Press, 1998, title page, copyright page, pp. 180-185.

* cited by examiner

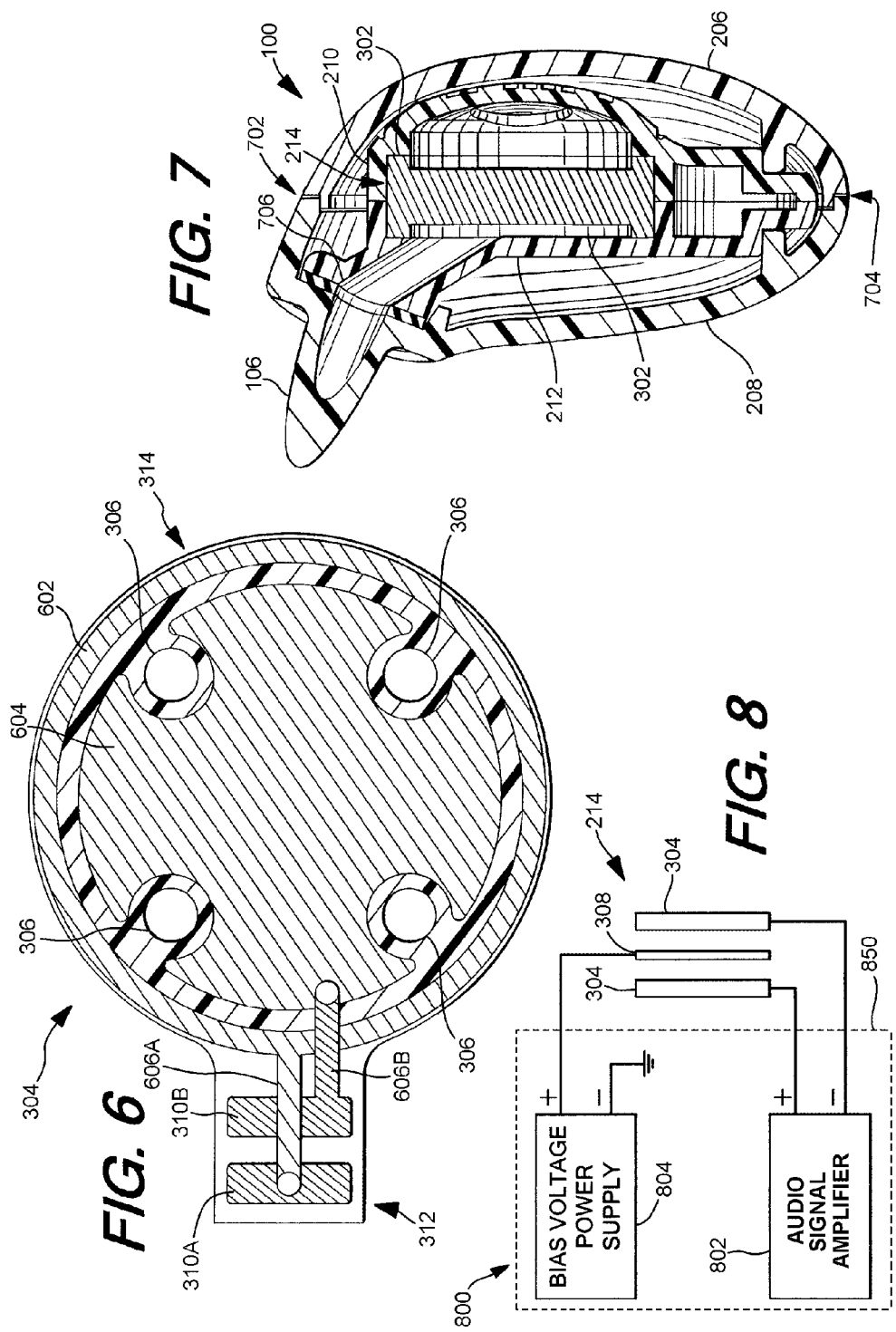

ELECTROSTATIC EARPHONE

TECHNICAL FIELD

This application generally relates to an electrostatic earphone. In particular, this application relates to an earphone with a closed-back housing, a sleeve for acoustically sealing to an ear canal, and an electrostatic transducer.

BACKGROUND

Loudspeakers and headphones can utilize an electrostatic transducer for sound reproduction that includes a tensioned conductive low-mass diaphragm positioned between a pair of conductive stator plates. Small air gaps may be present between the diaphragm and the stator plates, and the diaphragm may have a stationary charge relative to the stator plates. If no signal is applied to the stator plates, the diaphragm may be static and stays centered between the stator plates. When equal magnitude opposite-phase audio signals are applied to the stator plates, a net force imbalance may be created over the diaphragm, which displaces the diaphragm. In turn, the air adjacent to the diaphragm may be displaced to create sound corresponding to the audio signals.

As a result, loudspeakers and headphones using electrostatic transducers may have very low harmonic distortion, full bandwidth frequency response, and high fidelity sound reproduction, as compared to loudspeakers and headphones with moving coil transducers. Electrostatic transducers may have these characteristics due to the push-pull, constant charge electrostatic drive and the relatively low mass of the diaphragm. In particular, the low harmonic distortion may be due to the push-pull electrostatic drive and the nearly constant bias charge on the diaphragm. However, to generate sufficient and acceptable sound output with an electrostatic transducer, high voltages may be required for biasing the diaphragm and for the audio signals. Listeners of loudspeakers and headphones with electrostatic transducers may need to be adequately protected from the possibility of electric shock and fire because of the high voltages utilized.

Headphones may be of an open-back type or closed-back type, regardless of the type of transducer within the headphones. Whether a particular listener uses an open-back headphone or a closed-back headphone may depend on the application and personal preferences of the listener. Open-back headphones may have housings with backs that are open to the environment, which may allow ambient sound into the headphones and also allow sound from the headphones to escape into the environment. The sound produced in open-back headphones is generally considered more natural with an increased depth of field, as compared to closed-back headphones. However, open-back headphones are not typically used in recording applications because sound from the headphones may be picked up by recording microphones. In contrast, closed-back headphones may have housings with backs that are closed to the environment, which may block ambient noise into the headphones and also reduce the amount of sound from the headphones that can escape into the environment. Closed-back headphones may typically be used for studio monitoring and recording applications.

Earphones are a type of headphone that can be inserted into the ear canal of a listener. Earphones may provide better noise isolation due to their placement in the ear canal and use of acoustically sealing sleeves, as compared to headphones that are placed over the ear or earbuds that are placed on the outer ear. Typical earphones with electrostatic transducers may be of the open-back type. However, some listeners, such as professional musicians and performers, may prefer closed-back earphones to prevent sound leakage in recording applications and to block ambient noise, particularly when using the earphones as an in-ear monitor.

Accordingly, there is an opportunity for an earphone that addresses these safety and sound reproduction concerns. More particularly, there is an opportunity for a closed-back earphone with an electrostatic transducer that adequately protects a listener from electric shock due to the high voltages used, has high fidelity sound reproduction, and blocks ambient noise.

SUMMARY

In an embodiment, an earphone assembly may include a closed-back housing with a nozzle for acoustic transmission of sound to an ear canal, a sleeve removably attached to an exterior of the nozzle for acoustically sealing to the ear canal, and an electrostatic transducer mounted within the housing. The electrostatic transducer may include a diaphragm with a conductive layer, a pair of diaphragm rings each in contact with respective sides of the diaphragm, and a pair of stator plates. At least one of the diaphragm rings may be in electrical contact with the conductive layer of the diaphragm. Each of the pair of stator plates may include an outer annular conductive portion that is in electrical contact with a DC bias voltage and with a diaphragm ring, a central conductive portion that is in electrical contact with an AC audio signal, and a plurality of holes. The central conductive portion may have a dielectric layer. The pair of stator plates and the diaphragm may be spaced apart by the pair of diaphragm rings. When the DC bias voltage and the AC audio signal are supplied, the diaphragm may generate sound that is output through the plurality of holes in the stator plates and through the nozzle to the ear canal of a listener.

In another embodiment, an earphone system may include a closed-back housing with a nozzle for acoustic transmission of sound to an ear canal, a sleeve removably attached to an exterior of the nozzle for acoustically sealing to the ear canal, an electrostatic transducer mounted within the housing, and an amplifier. The electrostatic transducer may include a diaphragm with a conductive layer, a pair of diaphragm rings each in contact with respective sides of the diaphragm, and a pair of stator plates. At least one of the diaphragm rings may be in electrical contact with the conductive layer of the diaphragm. Each of the pair of stator plates may include an outer annular conductive portion that is in electrical contact with a DC bias voltage and with a diaphragm ring, a central conductive portion that is in electrical contact with an AC audio signal, and a plurality of holes. The central conductive portion may have a dielectric layer. The amplifier may include a bias voltage supply circuit for generating the DC bias voltage from a power source and an audio signal amplifier circuit for generating the AC audio signal from an audio input signal received by the amplifier. The pair of stator plates and the diaphragm may be spaced apart by the pair of diaphragm rings. When the DC bias voltage and the AC audio signal are supplied, the diaphragm may generate sound that is output through the plurality of holes in the stator plates and through the nozzle to the ear canal of a listener.

In a further embodiment, an earphone assembly may include a closed-back housing with a nozzle for acoustic transmission of sound to an ear canal, a sleeve removably attached to an exterior of the nozzle for acoustically sealing to the ear canal, and an electrostatic transducer mounted within the housing. The electrostatic transducer may include a diaphragm with a conductive layer, a pair of diaphragm rings each in contact with respective sides of the diaphragm, and a pair of stator plates in contact with the diaphragm rings. At least one of the diaphragm rings may be in electrical contact with the conductive layer of the diaphragm. Each of the pair of stator plates may include a conductive portion that is in electrical contact with an AC audio signal, and a plurality of holes. The central conductive portion may have an electret layer with a permanent electric charge. The pair of stator plates and the diaphragm may be spaced apart by the pair of diaphragm rings. When the AC audio signal is supplied, the diaphragm may generate sound that is output through the plurality of holes in the stator plates and through the nozzle to the ear canal of a listener.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 6 is a depiction of a stator plate of an electrostatic transducer in an electrostatic earphone in accordance with some embodiments.

FIG. 7 is a cross-section of an electrostatic earphone taken along the line 7-7 of FIG. 1 in accordance with some embodiments.

FIG. 8 is a block diagram of an electrostatic earphone system in accordance with some embodiments.

DETAILED DESCRIPTION

Figure 1:
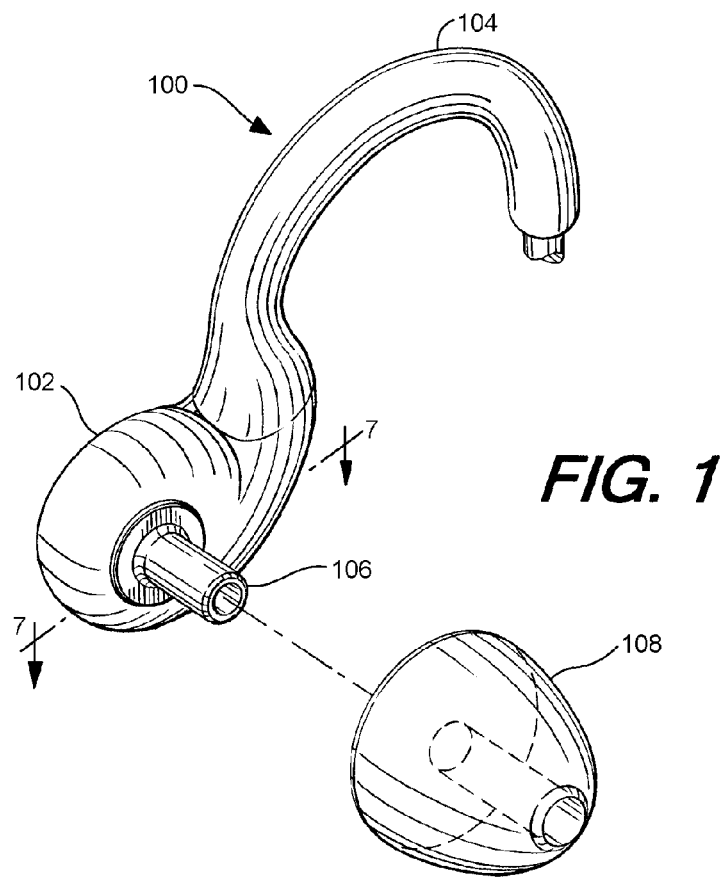
FIG. 1 is an electrostatic earphone in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates an electrostatic earphone 100 that may include a closed-back housing 102 that encloses an electrostatic transducer, and a cable assembly 104 for electrically connecting the earphone 100 to an amplifier. The closed-back housing 102 may include a nozzle 106 that can transmit sound generated by the earphone 100 to an ear canal of a listener. The earphone 100 as shown in FIG. 1 may be configured to be used in the right ear of a listener. In other embodiments, the earphone 100 may be configured for use in the left ear of a listener by changing the orientation of the nozzle 106 and other relevant components. The housing 102 and the nozzle 106 may be constructed of a non-conductive material, such as plastic (e.g., Polycarbonate/Acrylonitrile Butadiene Styrene (PC/ABS)) or other suitable material. The earphone 100 may include an electrostatic transducer 214 for generating sound according to an audio signal, as detailed further below. The earphone 100 may be used for applications such as personal listening, mixing and mastering of recorded music, stage monitoring by a performer, and other uses.

The cable assembly 104 may be configured such that it can rest over the ear of a listener. In one embodiment, the cable assembly 104 may be a cylindrical five-conductor cable terminated at one end with a five-pin connector (not shown) for connection to the amplifier. The diameter of the cable assembly 104 may be less than 0.15", for example. The cable assembly 104 may be low capacitance (e.g., less than 20 pF/ft) and have an appropriate dielectric strength for high voltage use and mechanical robustness. The cable assembly 104 may be split into a Y-junction (not shown) such that two three-conductor cables may be terminated at left and right earphones 100. One of the three-conductor cables is shown connected to an earphone 100 in FIGS. 1 and 2. The five conductors in the cable assembly 104 may respectively carry a DC bias voltage and components of an AC audio signal, e.g., right channel positive polarity, right channel negative polarity, left channel positive polarity, and left channel negative polarity. The DC bias voltage may be 600 V and the AC audio signals may be 200 V peak, for example. In some embodiments, the AC audio signals may be 300 V peak or another voltage. The cable assembly 104 may include a flexible overmold at its interface with the earphone 100 so that there is relief when the cable assembly 104 is flexed and/or twisted. In another embodiment, the cable assembly 104 may be a flat ribbon cable or other appropriately structured cable.

A sleeve 108 can be attached to the nozzle 106 so that the sleeve 108 acoustically seals the ear canal of the listener from the environment. The sleeve 108 ensures that the only acoustic path for sound from the electrostatic transducer 214 in the earphone 100 is through the nozzle 106 to the ear canal of the listener. The sleeve 108 may be composed of foam, gel, rubber, silicone, or other suitable material. While the sleeve 108 depicted in FIG. 1 has a smooth surface, one embodiment of a sleeve 108 may include one or more flanges. The sleeve 108 may also include a wax guard to protect the nozzle 106 from accumulating contaminants and earwax from the ear canal of the listener, which may degrade the sound quality of the earphone 100. In some embodiments, the nozzle 106 may be designed to break away from the housing 102 if a crushing force, e.g., greater than 15 lb, is applied perpendicularly to the axis of the nozzle 106 at the end of the nozzle 106.

Figure 2:
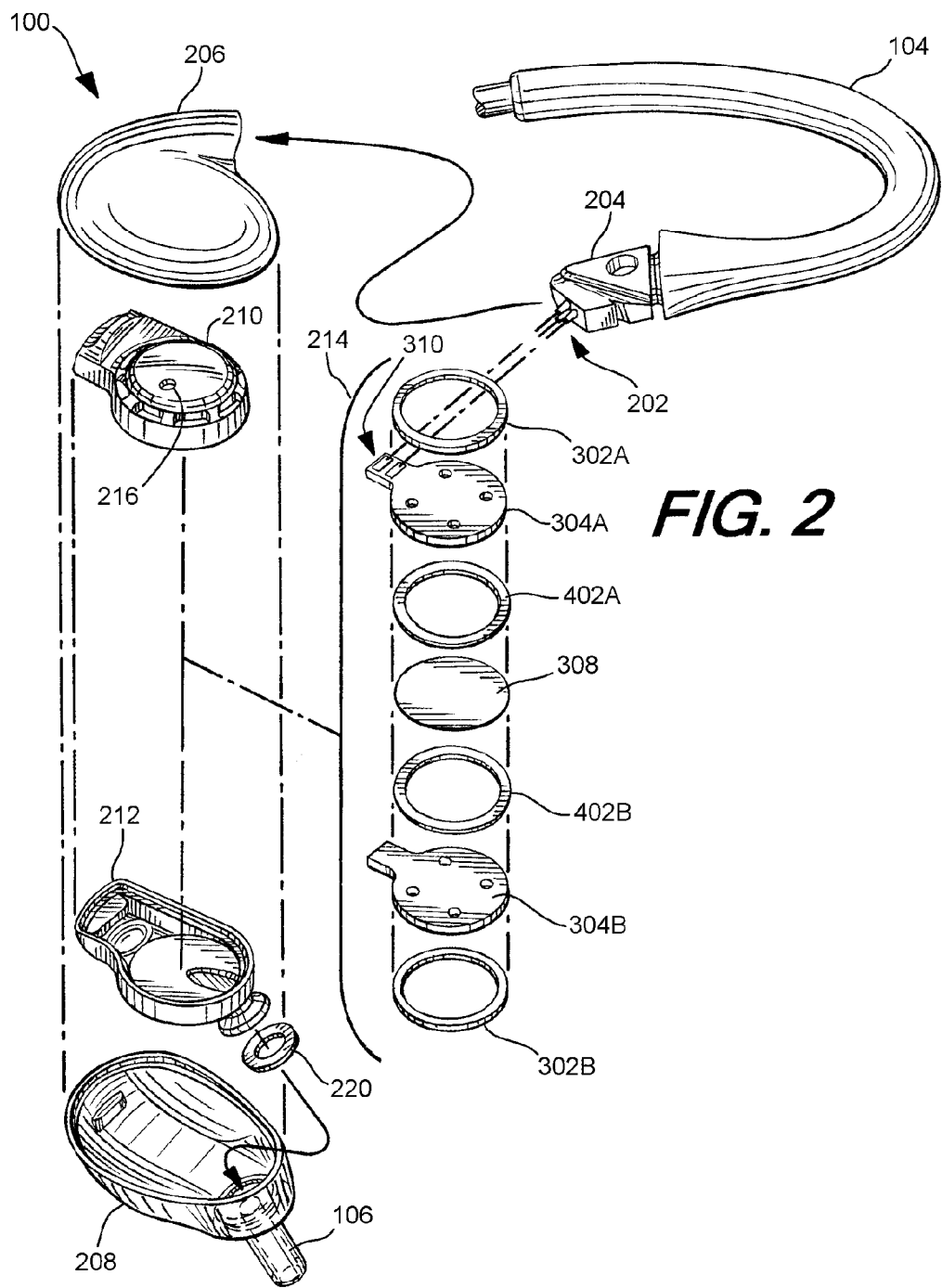
FIG. 2 is an exploded view of an electrostatic earphone in accordance with some embodiments.

FIG. 2 illustrates an exploded view of the electrostatic earphone 100 of FIG. 1. The cable assembly 104 is shown with three conductors 202 for carrying the DC bias voltage, positive polarity audio signal, and negative polarity audio signal. A mating portion 204 of the cable assembly 104 is also shown for interfacing with the housing 102 of the earphone 100. The housing 102 may include an outer housing that includes a rear earpiece housing 206 and a front earpiece housing 208. The rear earpiece housing 206 and the front earpiece housing 208 may be configured to mate with one another using appropriate mating surfaces. The front earpiece housing 208 may include the nozzle 106, as described above. The rear earpiece housing 206 and the front earpiece housing 208 may be held together mechanically by threads, an epoxy, an adhesive, and/or ultrasonic welds.

The housing 102 may also include an inner housing that includes a rear volume 210 and a front volume 212. The rear volume 210 and the front volume 212 may be configured to mate with one another using appropriate mating surfaces. An electrostatic transducer 214 for generating sound may be mounted within the inner housing. The inner housing may be mounted within the outer housing. Features within the rear earpiece housing 206 and the front earpiece housing 208 may assist in mounting the inner housing within the outer housing during manufacture. Components of the outer housing and the inner housing may be constructed of a non-conductive material, such as PC/ABS, a flexible polymer overmold, a hard polymer case, a polymer fiber bag, or a woven fiber bag. By utilizing an inner housing mounted within an outer housing for the housing 102, a listener may be insulated from the electrostatic transducer 214 by two layers. Accordingly, if the outer housing fails, e.g., due to a crushing force, the inner housing may still insulate the listener from the electrostatic transducer 214. The electrostatic transducer 214 is detailed further below.

The rear volume 210 may include an acoustic port 216 and a resistance screen (not shown) mounted over the acoustic port 216 on the inside of the rear volume 210. The resistance screen may be porous and may be mounted using an adhesive around the inside of the rear volume 210. The acoustic port 216 and the resistance screen may assist in setting the acoustical impedance into the rear earpiece housing 206 from the rear volume 210 to tune the low frequency response (e.g., less than 1 kHz) of the earphone 100. A hydrophobic and acoustic damper 220 may be mounted on an interior of the nozzle 106 for purposes of resisting moisture and physically blocking insertion of items from outside the nozzle 106. The damper 220 may be a "can" damper, an electroformed screen, polyester, or etched metal piece with holes that can be attached or inserted into the nozzle 106, for example. In some embodiments, the damper 220 may be mounted on the inside of the front earpiece housing 208.

The electrostatic transducer 214 is illustrated in an exploded view in FIG. 2. The electrostatic transducer 214 may be mounted within the rear volume 210 and the front volume 212 of the inner housing. The electrostatic transducer 214 may generate sound when equal magnitude opposite-phase audio signals are applied to a pair of stator plates 304A and 304B that displace and deflect a diaphragm 308 positioned between the stator plates. The diaphragm 308 in turn displaces air to generate the sound according to the audio signals. Each of the stator plates 304A and 304B may include holes for allowing the acoustic transmission of sound generated by the diaphragm 308. The generated sound may be output through the holes of the stator plates 304A and 304B and through the nozzle 106 to the ear canal of a listener.

The motion of the diaphragm 308 in the electrostatic transducer 214 may be dominated by the stiffness of the internal cavity created by the rear volume 210 and the front volume 212 of the inner housing, due to the closed-back nature of the earphone 100. Because the internal cavity is relatively small, as compared to electrostatic earphones of the open-back type, the displacement of the diaphragm 308 is relatively small. The displacement of a diaphragm in an electrostatic earphone of the open-back type is primarily controlled by the stiffness of the diaphragm at low frequencies because of the low mass and high fundamental resonance frequency of the diaphragm. However, for listeners using the earphone 100, the acoustic space is restricted to the ear canal since the sleeve 108 acoustically isolates the ear canal of the listener from the environment. Accordingly, although the stiffness of the internal cavity may dominate the motion of the diaphragm 308, this stiffness is tolerable since smaller displacements of the diaphragm 308 will achieve adequate sound pressure levels, as compared to electrostatic earphones of the open-back type.

Sealing gaskets 302A and 302B may be adhered to the outer-facing sides of the stator plates 304A and 304B, respectively, for assistance in mounting the electrostatic transducer 214 within the inner housing of the earphone 100. The outer-facing sides of the stator plates 304A and 304B may also include one or more contacts 310 for electrical connection to the conductors 202 of the cable assembly 104. Diaphragm rings 402A and 402B may be respectively positioned between the diaphragm-facing sides of the stator plates 304A and 304B and the diaphragm 308. As detailed further below, a DC bias voltage carried on one of the conductors 202 may be provided to the diaphragm 308 via a contact 310, an outer annular conductive portion of the stator plates 304A and 304B, and one or more of the diaphragm rings 402A and 402B.

Figure 3:
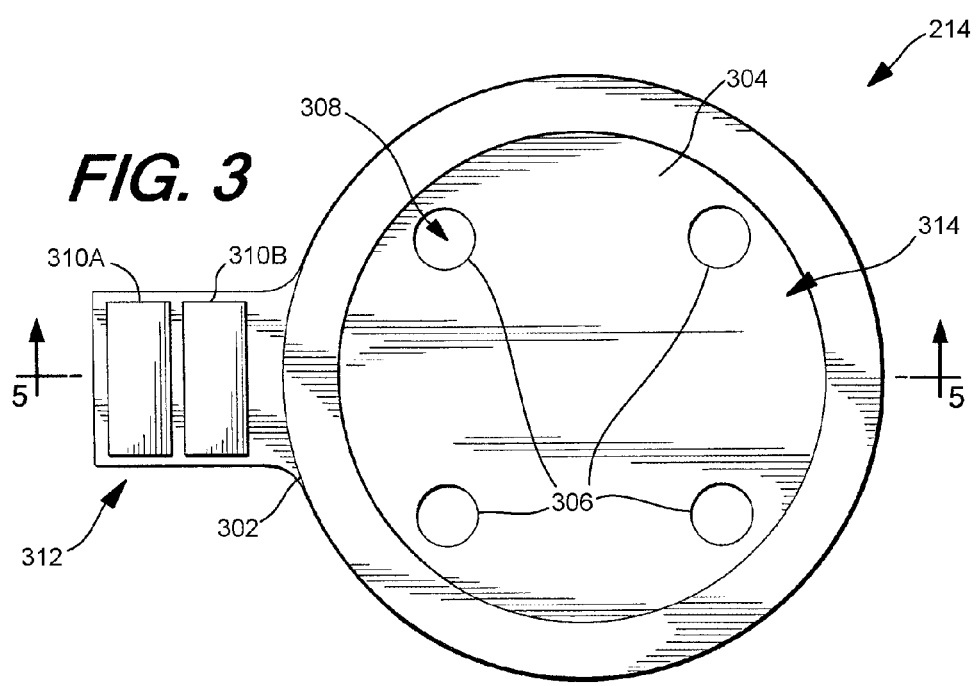
FIG. 3 is a plan view of an electrostatic transducer in an electrostatic earphone in accordance with some embodiments.

FIG. 3 illustrates a plan view of an electrostatic transducer 214 that may be mounted within the electrostatic earphone 100 of FIG. 1. A sealing gasket 302 may be adhered to the stator plate 304 and may be constructed of closed-cell foam, silicone rubber, or a polymer, for example, and have adhesive on one side for adhering the sealing gasket 302 to the stator plate 304. One of the stator plates 304 is shown in the plan view of the electrostatic transducer 214 of FIG. 3, and in particular, shows the outer-facing side of the stator plate 304. The outer-facing side of the stator plate 304 may face the rear volume 210 or the front volume 212 of the inner housing.

The stator plate 304 may include a tab portion 312 and a circular portion 314. The tab portion 312 may include contacts 310A and 310B for electrically connecting the stator plate 304 to an amplifier through the cable assembly 104. The conductors 202 of the cable assembly 104 may be soldered or otherwise electrically connected to the contacts 310 for carrying the DC bias signal and the AC audio signal. The circular portion 314 of the stator plate 304 may include one or more non-plated through holes 306 that allow acoustic transmission of sound generated by the diaphragm 308. The stator plates 304 may be printed circuit boards constructed of epoxy laminate, e.g., FR4, with etched copper layers to create selectively conductive surfaces, as described further below. In particular, the outer-facing side of the stator plate 304 shown in FIG. 3 may be non-conductive, with the exception of the contacts 310.

The diaphragm-facing side of the stator plate 304 is depicted in more detail in FIG. 6 and may face a diaphragm ring 402 and the diaphragm 308. The diaphragm-facing side of the stator plate 304 may include an outer annular conductive portion 602 and a central conductive portion 604. The remainder of the diaphragm-facing side of the stator plate 304 may be non-conductive. A contact 310A may be electrically connected to the DC bias voltage from an amplifier, such as via a conductor 202 of the cable assembly 104. The contact 310A may also be electrically connected to the outer annular conductive portion 602 through a trace 606A. In this way, the DC bias voltage may be supplied to the diaphragm 308 through the diaphragm ring 402 via the contact 310A, the trace 606A, and the outer annular conductive portion 602.

A contact 310B may be electrically connected to the AC audio signal from the amplifier, such as via another conductor 202 of the cable assembly 104. The contact 310B may also be electrically connected to the central conductive portion 604 through a trace 606B. The central conductive portion 604 may be a copper layer coated with an insulating dielectric layer, such as a dry-film soldermask, that has sufficient dielectric strength to withstand the high voltages of the DC bias voltage and the AC audio signal. In some embodiments, the entire diaphragm-facing side of the stator plate 304, excluding the outer annular conductive portion 602, may be coated with the insulating dielectric layer. The insulating dielectric layer may prevent a short circuit between the diaphragm 308 and the stator plate 304, if the diaphragm 308 makes physical contact with the stator plate 304 when the diaphragm 308 deflects during operation of the electrostatic transducer 214. The insulating dielectric layer may also prevent the creation of a hole in the diaphragm 308 if the diaphragm 308 and the stator plate 304 make physical contact. Moreover, the sensitivity of the electrostatic transducer 214 may be tailored by coating the stator plate 304 with the insulating dielectric layer. In particular, the dielectric constant and/or the thickness of the dielectric layer may determine the sensitivity of the electrostatic transducer 214. The thickness of the insulating dielectric layer on the stator plate 304 may be less than the spacing between the diaphragm 308 and the stator plate 304.

In another embodiment, the diaphragm-facing side of the stator plate 304 may be coated with an electret layer, such as FEP (fluorinated ethylene propylene) and/or PTFE (polytetrafluoroethylene). The electret layer may have a surface charge distribution to bias the electrostatic transducer 214, in lieu of supplying a DC bias voltage to the diaphragm 308. Although the diaphragm 308 is not connected to a DC bias voltage in this embodiment, the diaphragm 308 may be electrically connected, e.g., to ground through a resistor with a large resistance value, or through a resistive divider between the differential AC audio signals so that the diaphragm 308 is biased halfway between the differential AC audio signals. The diaphragm 308 may be electrically connected via the contact 310A, the trace 606A, the outer annular conductive portion 602, and the diaphragm ring 402, in a similar fashion as described above.

It will be understood that since the stator plate 304 may be a printed circuit board (PCB), the contacts 310A and 310B may be present on one layer of the PCB (e.g., the outer-facing side) and the outer annular conductive portion 602 and the central conductive portion 604 may be present on one or more layers of the PCB (e.g., the diaphragm-facing side). The PCB may also be composed of other layers, e.g., FR4 epoxy laminate. In some embodiments, the rear side of the FR4 epoxy laminate layer may be covered by a dry-film soldermask. The layers of the PCB may be attached and/or adhered to one another, as is known in the art. The respective electrical connections between the contacts 310A and 310B and the portions 602 and 604 may be accomplished through the traces 606A and 606B on the PCB and appropriate vias between the layers of the PCB. Accordingly, FIG. 6 is a depiction of a stator plate 304 that shows a simplified view of the electrical connections and configuration of the stator plate 304, without explicitly showing the layers and vias of the printed circuit board.

Figure 4:
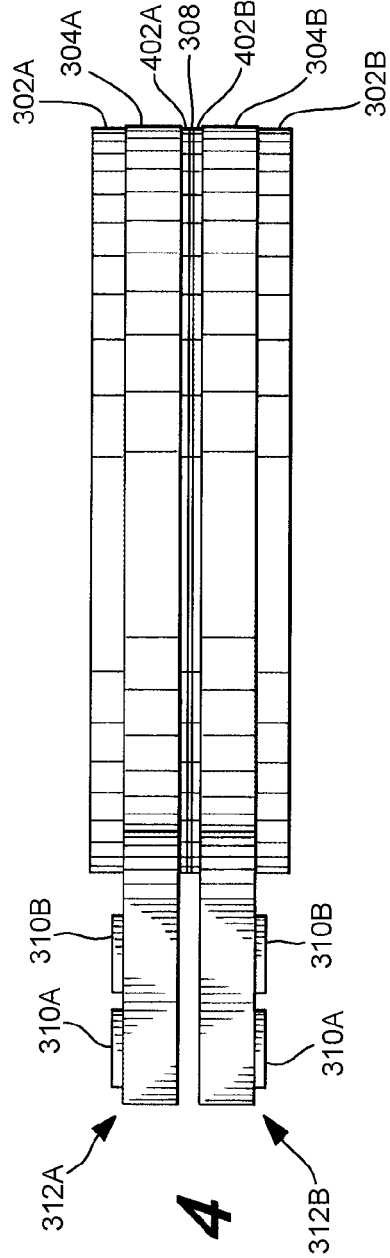
FIG. 4 is an elevational view of an electrostatic transducer in an electrostatic earphone in accordance with some embodiments.
Figure 5:
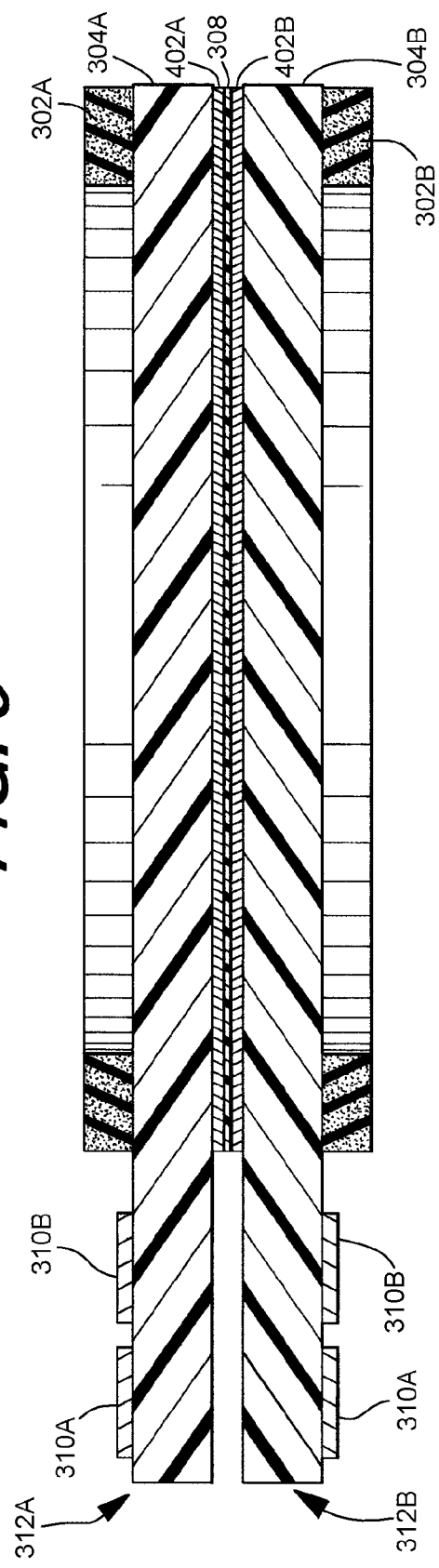
FIG. 5 is a cross-section of an electrostatic transducer in an electrostatic earphone taken along the line 5-5 of FIG. 3 in accordance with some embodiments.

FIG. 4 illustrates an elevational view of the electrostatic transducer 214 and FIG. 5 illustrates a cross-section of the electrostatic transducer 214 taken along the line 5-5 of FIG. 3. The electrostatic transducer 214 may include sealing gaskets 302A and 302B, stator plates 304A and 304B, diaphragm rings 402A and 402B, and diaphragm 308. The relative thicknesses of the components of the electrostatic transducer 214 can be seen in FIG. 4 and FIG. 5. As described above, the diaphragm 308 may be positioned between the stator plates 304A and 304B for generating sound when audio signals are applied to the stator plates 304A and 304B. The diaphragm 308 may be attached to the diaphragm rings 402A and 402B using an adhesive or epoxy. The diaphragm rings 402A and 402B may be 0.005" thick and may be constructed from stainless steel, for example. Each of the diaphragm rings 402A and 402B may serve the purposes of tensioning the diaphragm 308; making electrical contact to convey the DC bias signal from the amplifier to the diaphragm 308 through the contact 310A, trace 606A, and outer annular conductive portion 602; and providing spacing between the stator plates 304A and 304B and the diaphragm 308.

The diaphragm 308 may be constructed of a polymer film, such as PET (polyethylene terephthalate) or PPS (polyphenylene sulfide), and have a thin conductive coating on one or both sides. For example, the diaphragm 308 may be 0.00008" thick and have a diameter of 0.33", and the conductive coating on the diaphragm 308 may be 525 Å (angstroms). To construct the structure of the diaphragm 308 and the diaphragm rings 402A and 402B, an epoxy may be screened onto the diaphragm rings 402A and 402B. The material for the diaphragm 308, e.g., a tensioned polymer sheet with a pre-deposited conductive coating, may be brought into contact with the diaphragm rings 402A and 402B. After the epoxy is cured, the diaphragm/diaphragm ring structure may be cleared from the polymer sheet.

In one embodiment, the electrostatic earphone 100 may include a high-frequency electrostatic transducer (not shown) mounted coaxially with the electrostatic transducer 214 in the housing 102. The high-frequency electrostatic transducer may have a diameter of less than or equal to 5 mm, for example, and may be configured to generate high frequency sound. The high-frequency electrostatic transducer may be similarly constructed as the electrostatic transducer 214 described above. The AC audio signals may be connected to the electrostatic transducer 214 and the high-frequency electrostatic transducer in parallel such that the crossover between frequencies naturally occurs at the extremes of the bandwidth for each of the transducers. Alternatively, a crossover circuit may be integrated into the amplifier supplying the AC audio signals. Separate AC audio signals for the appropriate frequency range may be conveyed to each of the transducers through the cable assembly 104.

FIG. 7 illustrates a cross-section of the electrostatic earphone 100 taken along the line 7-7 of FIG. 1. The outer housing, including the rear earpiece housing 206 and the front earpiece housing 208, is shown in FIG. 7, as well as the nozzle 106 of the front earpiece housing 208. The rear earpiece housing 206 and the front earpiece housing 208 may mate to one another with the mating shoulders 702 and 704. The inner housing, including the rear volume 210 and the front volume 212, is also shown in FIG. 7. The front volume 212 may include a nozzle interface 706 that can acoustically transmit the sound generated by the electrostatic transducer 214 to the nozzle 106.

The double insulating feature of the electrostatic earphone 100 may be seen in FIG. 7. In particular, the electrostatic transducer 214 may be mounted within the inner housing (consisting of the rear volume 210 and the front volume 212), and the inner housing may in turn be mounted within the outer housing (consisting of the rear earpiece housing 206 and the front earpiece housing 208). In addition, it can be seen in FIG. 7 that the nozzle 106 may be oriented at a first angle with respect to the electrostatic transducer 214, and that the nozzle interface 706 may be oriented at a different second angle with respect to the electrostatic transducer 214. Orienting the nozzle 106 and the nozzle interface 706 at different angles may prevent a probe or other foreign object that is inserted through the nozzle 106 from physically contacting the electrostatic transducer 214 and reduce the possibility of electric shock.

FIG. 8 illustrates a block diagram of an electrostatic earphone system 800. The system 800 may include the electrostatic earphone 100 and in particular, the electrostatic transducer 214. As described above, the electrostatic transducer 214 may include a pair of stator plates 304 and a diaphragm 308, as shown in the simplified view of FIG. 8. An audio signal amplifier 802 may supply AC audio signals to the stator plates 304, and a bias voltage power supply 804 may supply a DC bias voltage to the diaphragm 308. An amplifier device 850 may include the audio signal amplifier 802 and the bias voltage power supply 804. The amplifier device 850 can be in communication with the electrostatic earphone 100 via a cable assembly 104, for example. It should be noted that the electrostatic earphone system 800 shown in FIG. 8 illustrates one earpiece channel, i.e., left or right, and that the other earpiece channel may have substantially the same configuration and connections to the audio signal amplifier 802 and the bias voltage power supply 804.

Equal magnitude opposite-phase AC audio signals may be applied to the stator plates 304 from an audio signal amplifier 802 to cause displacement of the diaphragm 308 that is positioned between the stator plates 304. The displacement of the diaphragm 308 may generate sound according to the AC audio signals from the audio signal amplifier 802. The AC audio signals may include a positive polarity and a negative polarity that may be electrically connected to respective stator plates 304. A high frequency switching power supply in the audio signal amplifier 802 may create the DC bias voltage and the amplifier power supply rails so that the voltage of the AC audio signals is sufficient. The AC audio signals may be up to 200 V peak, the current of the AC audio signals from the audio signal amplifier 802 may be limited to 500 µA RMS, and the frequency of the high frequency switching power supply may be 200 kHz, for example. Other appropriate voltages, currents, and frequencies may be utilized. The AC audio signals may be created and/or derived from an external audio source, such as a media player, mobile phone, smartphone, stereo system, computer, tablet, compact disc player, or other device. The external audio source may be connected to the audio signal amplifier 802 via a stereo plug, USB connection, or other appropriate connection. The AC audio signal amplifier 802 may include one or more audio gain stages, high voltage differential gain stages, and/or high voltage output stages.

The diaphragm 308 may be electrically connected to a DC bias voltage supplied from a bias voltage power supply 804. The DC bias voltage may be 600 V and the current of the DC bias voltage from the bias voltage power supply 804 may be limited to 30 µA, for example. Other appropriate voltages and currents may be utilized. A voltage multiplier circuit may be used to create the DC bias voltage from an appropriate power source. In some embodiments, the power source may include a 3 V DC power source (e.g., two alkaline batteries), a 4.2 V lithium ion battery, a USB port (5 V), a 5 V DC power supply connected to a wall outlet, and/or other power sources. The voltage multiplier circuit may include one or more high voltage switching power supplies and/or other circuitry in order to sufficiently generate the DC bias voltage.

In some embodiments, the amplifier device 850 may be constructed as a bodypack or a belt pack. The power source(s) may be included in the amplifier device 850 for generating the AC audio signals and the DC bias voltage. In addition, the external audio source may be connected to the amplifier device 850. In one embodiment, the housing of the amplifier device 850 may be constructed of metal and may have dimensions of 3.5"×2.5"×1". The amplifier device 850 may include a 3.5 mm stereo input jack for analog audio input, a USB receptacle, and a six-pin output jack that carries the DC bias voltage and the AC audio signals. The cable assembly 104 may be connected to the six-pin output jack to convey the DC bias voltage and the AC audio signals to the earphone 100, for example. Other appropriate inputs and outputs may be included on the amplifier device 850, such as a coaxial digital jack, a mini-optical jack, an optical digital jack, an XLR input, and other interfaces.

Safety features may be included in the amplifier device 850 to protect a listener from the high voltages created by the audio signal amplifier 802 and the bias voltage power supply 804. In particular, the bias voltage power supply 804 may include resistor circuitry with a large resistance value to limit the short circuit current of the DC bias voltage. The short circuit current of the DC bias voltage may be limited to less than 30 µA using resistor circuitry with a 20 MΩ resistance value, for example. The housing of the amplifier device 850 may be constructed such that the circuitry within the amplifier device 850 cannot be accessed directly, such as by a probe or other foreign object. Furthermore, in some embodiments, the circuitry of the audio signal amplifier 802 and the bias voltage power supply 804 may only be active when a proper connection is made to the electrostatic earphone 100, such as when a cable assembly 104 is properly inserted into the amplifier device 850, e.g., into the six-pin output jack.

The AC audio signals driven from the audio signal amplifier 802 may be internally connected to separate amplifier circuits that each has a short circuit current limiting feature. In some embodiments, the base current of an output transistor in an amplifier circuit may be bled through an output sense resistor shutdown circuit if excessive current is drawn, such as during a short circuit condition. The AC audio signals may also include redundant current limiting circuitry, such as a sense resistor in the amplifier rail pass transistors of the amplifier circuit that will trigger a shutdown if excessive current is drawn. The current of the AC audio signal may be limited to less than 500 µA RMS when short circuited, for example. If excessive current is drawn, a latch may shut down the high frequency switching power supply of the audio signal amplifier 802 until the amplifier device 850 is power cycled.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An earphone assembly, comprising:
a closed-back housing comprising a nozzle for acoustic transmission of sound to an ear canal;
a sleeve removably attached to an exterior of the nozzle, the sleeve for acoustically sealing to the ear canal; and
an electrostatic transducer mounted within the closed-back housing, comprising:
a diaphragm having a conductive layer;
a pair of diaphragm rings each in contact with respective sides of the diaphragm, wherein at least one of the pair of diaphragm rings is in electrical contact with the conductive layer of the diaphragm;
a pair of stator plates, each of the pair of stator plates comprising:
an outer annular conductive portion in electrical contact with a DC bias voltage and one of the pair of diaphragm rings;
a central conductive portion having a dielectric layer, the central conductive portion in electrical contact with an AC audio signal; and
a plurality of holes;
wherein:
each of the pair of stator plates and the diaphragm are spaced apart by each of the pair of diaphragm rings;
the diaphragm generates the sound when the DC bias voltage and the AC audio signal are supplied; and
the sound is output through the plurality of holes of each of the pair of stator plates and through the nozzle.

2. The earphone assembly of claim 1:
wherein the closed-back housing comprises:
an outer housing; and
an inner housing mounted within the outer housing; and
wherein the electrostatic transducer is mounted within the inner housing.

3. The earphone assembly of claim 2, wherein the inner housing comprises an acoustic port and a resistance screen mounted over the acoustic port.

4. The earphone assembly of claim 2, wherein:
the inner housing comprises a nozzle interface adapted to mate with an interior of the nozzle, the nozzle interface for acoustic transmission of the sound from the diaphragm to the nozzle and positioned at a first angle with respect to the diaphragm; and
the nozzle is positioned at a second angle with respect to the diaphragm.

5. The earphone assembly of claim 1, wherein the electrostatic transducer further comprises a pair of sealing gaskets each in contact with each of the pair of stator plates and with the closed-back housing.

6. The earphone assembly of claim 1, further comprising a hydrophobic and acoustic damper mounted on an interior of the nozzle.

7. The earphone assembly of claim 1, further comprising a cable assembly having a plurality of leads in electrical contact with the pair of stator plates, wherein the plurality of leads carries the DC bias voltage and the AC audio signal.

8. The earphone assembly of claim 1, wherein the pair of stator plates each comprises a printed circuit board.

9. The earphone assembly of claim 1, wherein each of the pair of stator plates further comprises:
a circular portion comprising the outer annular conductive portion, the central conductive portion, and the plurality of holes;
a tab portion comprising a plurality of contacts for electrical connections to the DC bias voltage and the AC audio signal; and
a plurality of conductive traces for electrically connecting the plurality of contacts with the outer annular conductive portion and the central conductive portion.

10. The earphone assembly of claim 1, further comprising further comprising a high-frequency electrostatic transducer mounted coaxially with the electrostatic transducer within the closed-back housing.

11. An earphone system, comprising:
a closed-back housing comprising a nozzle for acoustic transmission of sound to an ear canal;
a sleeve removably attached to an exterior of the nozzle, the sleeve for acoustically sealing to the ear canal;
an electrostatic transducer mounted within the closed-back housing, comprising:
a diaphragm having a conductive layer;
a pair of diaphragm rings each in contact with respective sides of the diaphragm, wherein at least one of the pair of diaphragm rings is in electrical contact with the conductive layer of the diaphragm;
a pair of stator plates, each of the pair of stator plates comprising:
an outer annular conductive portion in electrical contact with a DC bias voltage and one of the pair of diaphragm rings;
a central conductive portion having a dielectric layer, the central conductive portion in electrical contact with an AC audio signal; and
a plurality of holes; and
an amplifier comprising:
a bias voltage supply circuit for generating the DC bias voltage from a power source; and
an audio signal amplifier circuit for generating the AC audio signal from an audio input signal received by the amplifier;
wherein:
each of the pair of stator plates and the diaphragm are spaced apart by each of the pair of diaphragm rings;
the diaphragm generates the sound when the DC bias voltage and the AC audio signal are supplied; and
the sound is output through the plurality of holes of each of the pair of stator plates and through the nozzle.

12. The earphone system of claim 11:
wherein the closed-back housing comprises:
an outer housing; and
an inner housing mounted within the outer housing; and
wherein the electrostatic transducer is mounted within the inner housing.

13. The earphone system of claim 12, wherein:
the inner housing comprises a nozzle interface adapted to mate with an interior of the nozzle, the nozzle interface for acoustic transmission of the sound from the diaphragm to the nozzle and positioned at a first angle with respect to the diaphragm; and
the nozzle is positioned at a second angle with respect to the diaphragm.

14. The earphone system of claim 11, wherein the electrostatic transducer further comprises a pair of sealing gaskets each in contact with each of the pair of stator plates and with the closed-back housing.

15. The earphone system of claim 11, further comprising a hydrophobic and acoustic damper mounted on an interior of the nozzle.

16. The earphone system of claim 11, further comprising a cable assembly having a plurality of leads in electrical contact with the pair of stator plates, wherein the plurality of leads carries the DC bias voltage from the bias voltage supply circuit and the AC audio signal from the audio signal amplifier circuit.

17. The earphone system of claim 16, wherein the cable assembly comprises a flexible overmold adapted to interface with the closed-back housing, the flexible overmold for strain relief.

18. The earphone system of claim 11, wherein each of the pair of stator plates further comprises:
   a circular portion comprising the outer annular conductive portion, the central conductive portion, and the plurality of holes;
   a tab portion comprising a plurality of contacts for electrical connections to the DC bias voltage from the bias voltage supply circuit and the AC audio signal from the audio signal amplifier circuit; and
   a plurality of conductive traces for electrically connecting the plurality of contacts with the outer annular conductive portion and the central conductive portion.

19. The earphone system of claim 11, wherein the power source comprises one or more of a battery, a USB port, or a power supply connected to a wall outlet.

20. An earphone assembly, comprising:
   a closed-back housing comprising a nozzle for acoustic transmission of sound to an ear canal;
   a sleeve removably attached to an exterior of the nozzle, the sleeve for acoustically sealing to the ear canal; and
   an electrostatic transducer mounted within the closed-back housing, comprising:
      a diaphragm having a conductive layer;
      a pair of diaphragm rings each in contact with respective sides of the diaphragm, wherein at least one of the pair of diaphragm rings is in electrical contact with the conductive layer of the diaphragm;
      a pair of stator plates having an electret layer with a permanent electric charge, each of the pair of stator plates comprising:
         an outer annular conductive portion in electrical contact with one of the pair of diaphragm rings;
         a central conductive portion in electrical contact with an AC audio signal; and
         a plurality of holes;
   wherein:
      each of the pair of stator plates and the diaphragm are spaced apart by each of the pair of diaphragm rings;
      the diaphragm generates the sound when the AC audio signal is supplied; and
      the sound is output through the plurality of holes of each of the pair of stator plates and through the nozzle.

* * * * *